No. 736,304. PATENTED AUG. 11, 1903.
R. W. SCOTT & L. N. D. WILLIAMS.
SPLIT COLLAR FOR SHAFTS.
APPLICATION FILED AUG. 15, 1902.
NO MODEL.

Witnesses:-
Hamilton D. Turner
Herman E. Metius.

Inventors:
Robert W. Scott,
and
Louis N. D. Williams,
by their Attorneys

THE NORRIS PETERS CO., PHOTO-LITHO., WASHINGTON, D. C.

No. 736,304.

Patented August 11, 1903.

UNITED STATES PATENT OFFICE.

ROBERT W. SCOTT, OF PHILADELPHIA, AND LOUIS N. D. WILLIAMS, OF ASHBOURNE, PENNSYLVANIA.

SPLIT COLLAR FOR SHAFTS.

SPECIFICATION forming part of Letters Patent No. 736,304, dated August 11, 1903.

Application filed August 15, 1902. Serial No. 119,757. (No model.)

*To all whom it may concern:*

Be it known that we, ROBERT W. SCOTT, of Philadelphia, and LOUIS N. D. WILLIAMS, of Ashbourne, Montgomery county, Pennsylvania, both citizens of the United States, have invented certain Improvements in Split Collars for Shafts, of which the following is a specification.

The object of our invention is to so construct a split collar for shafts that the same can be securely confined to the shaft by clamp-screws, which directly engage the shaft and have a firm hold upon the split portion of the collar.

Figure 1:
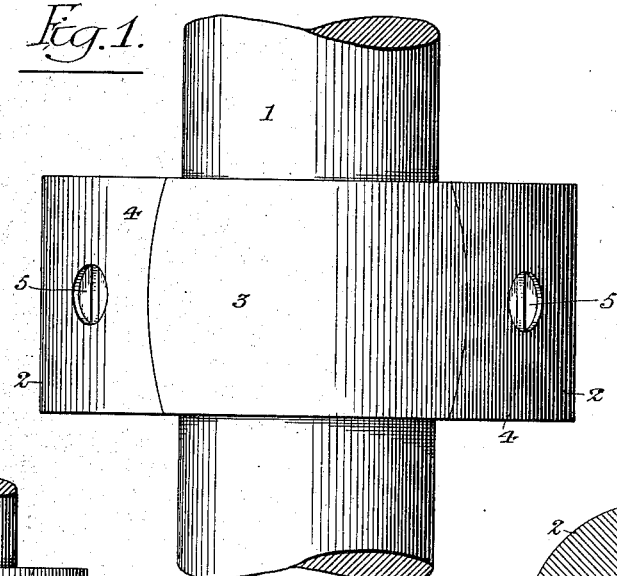
Figure 3:
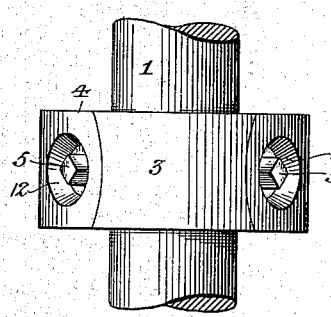
Figure 4:
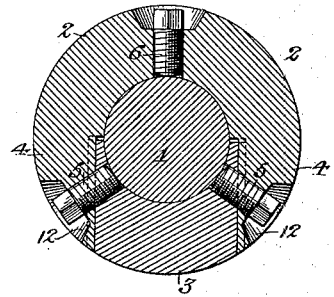
Figure 2:
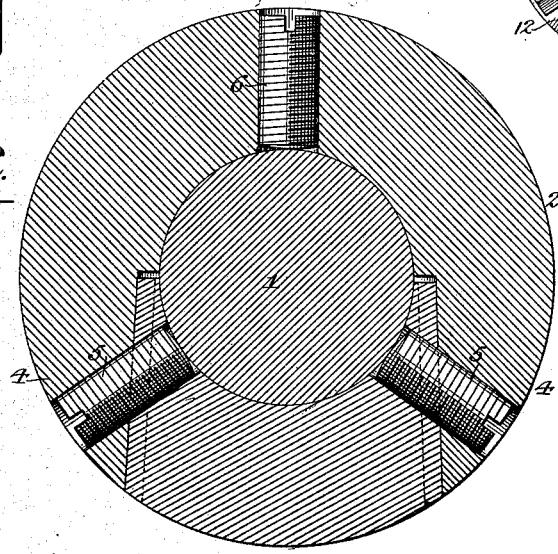

In the accompanying drawings, Figure 1 is a side elevation of a vertical shaft with collar secured thereon in accordance with our invention. Fig. 2 is a transverse section of the same. Fig. 3 is a side elevation of another form of collar embodying the invention, and Fig. 4 is a transverse section of the same.

1 represents the shaft, and 2 and 3 the two parts of the collar which is to be secured thereon, the part 2 of said collar comprising a segment extending half-way around the shaft and having projecting wings 4, which serve as guides for the other member 3 of the collar, the latter consisting of a segmental block embracing the other half of the shaft and fitting snugly between the projecting wings 4 of the portion 2 of the collar, as shown in Fig. 2. Diagonal openings are formed in the block 3 and in the wings 4, these openings registering with each other when the segmental block 3 is inserted and bears upon the shaft, and said openings being threaded for the reception of clamp-screws 5, which bear upon the shaft 1, as shown in Fig. 2, and therefore serve not only to secure the block 3 in position, but also to secure the entire collar firmly upon the shaft. In the present instance we have also shown an additional clamp-screw 6, adapted to a threaded opening in the portion 2 of the collar, so as to provide equidistant points of bearing upon the shaft; but this additional clamp-screw may be dispensed with, if desired. When the clamp-screws 5 are screwed home, their outer ends are flush with or below the periphery of the collar. Hence the latter presents no projections for contact with other bodies, and the collar can therefore, if desired, be caused to run within a suitable bearing with the same facility as a solid collar forged upon or otherwise secured to the shaft. By causing the clamp-screws 5 to engage with the threads formed both in the block 3 and wings 4 an extended hold of the clamp-screws upon these parts and a consequent firm gripping of the shaft is insured, and there is less tendency of the wings 4 to spring than there would be if the clamp-screws were adapted to threaded openings in these wings only. In some cases, however, only the openings in the block 3 need be threaded. The block 3 is readily removable from the shaft in a radial direction. Hence the collar can be applied to or removed from a shaft in a contracted space between pulleys, bearings, or other obstructions which would not permit of a fitting of the parts of the collar together by a longitudinal movement. Both of the clamp-screws 5 bear upon the same side of the shaft, so that the tendency of said screws is to press the other side of the shaft firmly against its seat in the main portion 2 of the collar.

In order to relieve the clamp-screws 5 from lateral pressure, the sides of the block 3 and the corresponding faces of the wings 4 are undercut, so as to present oppositely-inclined contact-faces, as shown in Fig. 1, so that any lateral movement of the block is resisted by these contact-faces. Only one face of the block 3 and one of the wings may be undercut, if desired. The outer ends of the clamp-screws may, if desired, be squared for the action of a wrench, as shown in Figs. 3 and 4, the wings 4 being recessed, as at 12, for the reception of the wrench. In this case the curving or beveling of the wings and block 3 are preferably the reverse of that shown in Fig. 1, so as to provide the proper length of threaded opening in the said wings 4.

Having thus described our invention, we claim and desire to secure by Letters Patent—

1. The combination in a split collar for shafts, of a portion partially encircling the shaft and having projecting wings, a block embracing the other part of the shaft and fitting between said wings so as to be removed radially from the shaft, each wing and the portion of the block engaging the same having threaded openings registering with each other, and clamp-screws adapted to said threaded openings and both bearing upon the same side of the shaft, substantially as specified.

2. A split collar for shafts comprising a segmental portion partially embracing the shaft and having projecting wings, a segmental block fitting between said wings and radially removable from the shaft, and diagonal clamp-screws passing through openings in the block and in the wings and bearing upon the shaft, substantially as specified.

3. A split collar for shafts comprising a portion partially embracing the shaft and having projecting wings, a block fitting between said wings and clamp-screws passing through said block and wings and bearing upon the shaft, the joint, or joints between the block and wings being undercut so as to resist movement of one portion of the collar in respect to the other in the direction of the axis of the shaft, substantially as specified.

4. A split collar for shafts comprising a portion partially embracing the shaft and having projecting wings, a segmental block embracing the other portion of the shaft and fitting between said wings and having one or more undercut faces engaging with a corresponding formation of the wings so as to resist movement of either part of the collar in respect to the other in the direction of the axis of the shaft, said block and wings having threaded openings registering with each other and clamp-screws adapted to said openings and bearing upon the shaft, substantially as specified.

In testimony whereof we have signed our names to this specification in the presence of two subscribing witnesses.

ROBERT W. SCOTT.
LOUIS N. D. WILLIAMS.

Witnesses:
F. E. BECHTOLD,
JOS. H. KLEIN.